(12) United States Patent
Sokolowski et al.

(10) Patent No.: US 12,404,906 B2
(45) Date of Patent: Sep. 2, 2025

(54) HEAT SHIELD PANEL ATTACHMENT BRACKET

(71) Applicant: Goodrich Corporation, Charlotte, NC (US)

(72) Inventors: Marcin Szymon Sokolowski, Wojslawice-Kolonia (PL); Bartlomiej Kamil Zuk, Legnica (PL); Nicholas Edward Scaggs, Springfield, OH (US); Nathaniel J. Herrmann, Springfield, OH (US)

(73) Assignee: Goodrich Corporation, Charlotte, NC (US)

( * ) Notice: Subject to any disclaimer, the term of this patent is extended or adjusted under 35 U.S.C. 154(b) by 390 days.

(21) Appl. No.: 17/944,960

(22) Filed: Sep. 14, 2022

(65) Prior Publication Data
US 2023/0098290 A1    Mar. 30, 2023

(30) Foreign Application Priority Data
Sep. 24, 2021   (EP) .................................. 21461601

(51) Int. Cl.
| F16D 65/847 | (2006.01) |
| B64C 25/42 | (2006.01) |
| F16D 65/78 | (2006.01) |

(52) U.S. Cl.
CPC ............ F16D 65/847 (2013.01); B64C 25/42 (2013.01); *F16D 2065/785* (2013.01)

(58) Field of Classification Search
CPC .. F16D 65/847; F16D 65/78; F16D 2065/785; F16D 2065/1392; B64C 25/42
See application file for complete search history.

(56) References Cited

U.S. PATENT DOCUMENTS

| 3,829,162 | A | 8/1974 | Stimson et al. |
| 4,120,536 | A | 10/1978 | Bernardi |
| 5,851,056 | A | 12/1998 | Hyde |
| 10,330,163 | B2 | 6/2019 | French et al. |
| 12,140,192 | B2 * | 11/2024 | Todd ....................... B64C 25/42 |
| 2003/0102710 | A1 | 6/2003 | Thorp et al. |
| 2005/0140075 | A1 | 6/2005 | Mishima |

(Continued)

OTHER PUBLICATIONS

EPO, Extended European Search Report dated Feb. 17, 2022 with EP Serial No. 21461601.3.

*Primary Examiner* — Pamela Rodriguez
(74) *Attorney, Agent, or Firm* — SNELL & WILMER L.L.P.

(57) ABSTRACT

An attachment bracket for fastening a heat shield panel of a wheel assembly to a radially inner surface of a wheel, the bracket having an essentially Z-shaped structure comprising an attachment part defining two inner contact surfaces in a first plane each shaped to form, in use, a surface contact with the radially outer surface of the heat shield panel, and a wheel connector part defining an outer contact surface in a second plane arranged to form, in use, a surface contact with the wheel when the heat shield panel is located in position relative to the wheel, where the first and second planes are essentially parallel but spaced apart in the axial direction of the wheel, and a sloping connector part extending from the first plane to the second plane connecting a first end of the attachment part to a first end of the wheel connector part.

20 Claims, 3 Drawing Sheets

(56) References Cited

U.S. PATENT DOCUMENTS

| | | | |
|---|---|---|---|
| 2018/0231083 A1* | 8/2018 | Crippa | F16D 65/847 |
| 2020/0189727 A1* | 6/2020 | French | F16D 65/0081 |
| 2020/0298965 A1 | 9/2020 | Francis et al. | |
| 2020/0400204 A1 | 12/2020 | Stras et al. | |
| 2021/0025284 A1 | 1/2021 | Sippel et al. | |
| 2023/0184305 A1* | 6/2023 | Todd | F16D 65/847 |
| | | | 301/6.2 |
| 2023/0382159 A1* | 11/2023 | Miller | B60B 21/12 |

* cited by examiner

HEAT SHIELD PANEL ATTACHMENT BRACKET

CROSS-REFERENCE TO RELATED APPLICATIONS

This application claims priority to, and the benefit of, EP Patent Application No. 21461601.3, filed Sep. 30, 2021 and titled "HEAT SHIELD PANEL ATTACHMENT BRACKET," which is incorporated by reference herein in its entirety for all purposes.

FIELD

The present disclosure relates to a bracket for attaching a heat shield assembly to a wheel for a vehicle especially, but not exclusively, for an aircraft wheel.

BACKGROUND

Wheels on aircraft and other vehicles are often provided with a brake assembly comprising a stack of brake discs mounted inside the wheel, within the tube well of the wheel. The brake operates by compressing the brake discs together to slow and stop rotation of the wheel. The friction between the pressed brake discs generates a large amount of heat which can cause damage to the wheel and/or tires. It is conventional to provide a heat shield between the brake assembly and the wheel rim or tube well to reduce the effects of the heat generated by braking on the wheel parts. The heat shield can also catch hot brake material that is ejected from the brake discs during braking, before it strikes the wheel.

Various types of heat shield are known but, typically, heat shields are in the form of metal sheets or panels provided concentric with the wheel tube well and spaced a small distance from the tube well. The heat shield can be provided as a single cylindrical piece but more typically is formed as a number of arcuate panels or sections that are attached together to form a complete cylindrical heat shield. Typically, the panels are provided with one or more brackets for attaching the panel to the wheel.

Particularly with the increased use of carbon disc brakes, which have greater energy absorption capability than steel brakes and are significantly lighter, but which are larger than steel brake discs. Although it is important for the heat shields to be robust, there is also a need for them to be as simple and lightweight as possible. In aircraft in particular, but also in other vehicles with braked wheels, there is a need to minimize the weight and size of the wheel assembly. Heat shields are therefore, often made of thin metal panels but may be arranged as two or more layers of panels with an insulation gap therebetween.

Because of the high temperature and high stress/vibrational environments that braked wheels operate in and high centrifugal forces acting on the heat shields, as well as changes in tire pressure, the heat shield can be caused to deform and/or deflect. This can cause high stresses on the heat shield and can cause the heat shield to come into contact with the wheel tube well which can, in turn, result in wheel abrasion. The greater the size and mass of the heat shield, the more problematic this is. The attachment bracket itself and its fixation to the heat shield adds to the overall mass of the heat shield and the attachment location of the bracket to the heat shield is a point where additional stresses can arise especially when the heat shield deflects or deforms. This is even more of an issue for carbon brakes because they are larger and so there is less space between the discs and the wheel.

There is a need for a heat shield assembly which is less prone to deflection and deforming and also an improved attachment bracket, so as to avoid or reduce damage to the heat shield and to avoid or reduce wheel abrasion and to simplify the heat shield design.

SUMMARY

According to the present disclosure, there is provided an attachment bracket for fastening a heat shield panel of a wheel assembly to a radially inner surface of a wheel, the bracket having an essentially Z-shaped structure comprising an attachment part defining two inner contact surfaces in a first plane each shaped to form, in use, a surface contact with the radially outer surface of the heat shield panel, and a wheel connector part defining an outer contact surface in a second plane arranged to form, in use, a surface contact with the wheel when the heat shield panel is located in position relative to the wheel, where the first and second planes are essentially parallel but spaced apart in the axial direction of the wheel, and a sloping connector part extending from the first plane to the second plane connecting a first end of the attachment part to a first end of the wheel connector part.

Also provided is a heat shield assembly and a wheel assembly

BRIEF DESCRIPTION OF THE DRAWINGS

The assembly according to the disclosure will be described, by way of example only, with reference to the drawings. Variations and modifications are possible within the scope of the claims.

DETAILED DESCRIPTION

Figure 1:
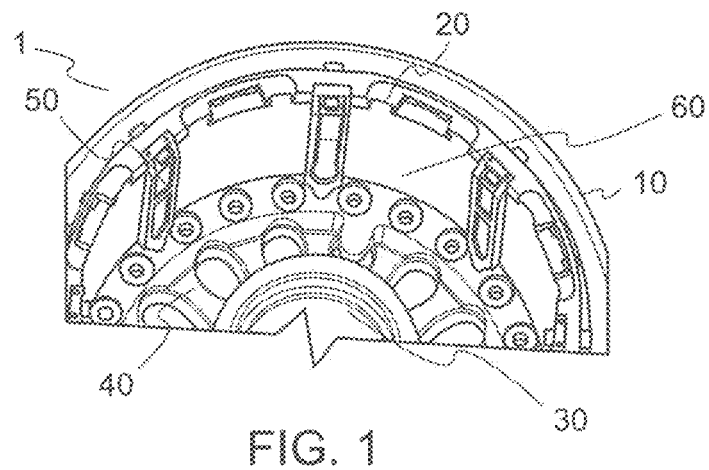
FIG. 1 shows an example of a heat shield in a wheel.

FIG. 1 shows a section of a typical wheel assembly comprising a wheel rim or tube well 1 having an outer diameter surface 10, on which a tire (not shown) will usually be mounted, and an inner diameter surface 20 defining an interior cavity in which a brake assembly (not shown) will typically be arranged around a wheel hub 30. The hub 30 would be attached by bearing to an axle (not shown). The hub 30 is connected to the wheel rim 1 via a web 40. Rotor disc drive lugs 50 extend axially across the tube well 1 for engagement with the brake discs.

To protect the wheel rim 1 from the heat generated during hard braking or from brake disc material ejected during braking, a heat shield is mounted to the inner diameter surface 20 of the wheel. The heat shield may be a single tubular shield or, as shown in this example, may be formed of several heat shield panels 60 provided between the rotor drive lugs 50. The heat shield/panels 60 is in the form of an arcuate thin metal sheet or several thin metal sheets and is attached to the wheel so as to be spaced apart from the wheel inner diameter surface by a small insulation gap (not shown). Where the heat shield is made of a number of panels or segments attached together, the adjoining side edges of the panels are provided with complementary attachment features (not shown) to lock the panels together.

The heat shield 60 is attached to the inner diameter surface 20 of the wheel 1 by means of attachment brackets 70 spaced around the heat shield 60. The number of brackets and the spacing therebetween, as well as the size of the brackets, will depend on the wheel assembly design and use.

Figure 2A:
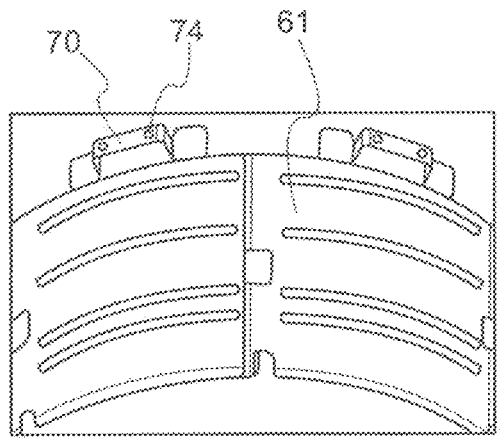
FIG. 2A shows attachment brackets for attaching a heat shield to a wheel in a conventional assembly.
Figure 2B:
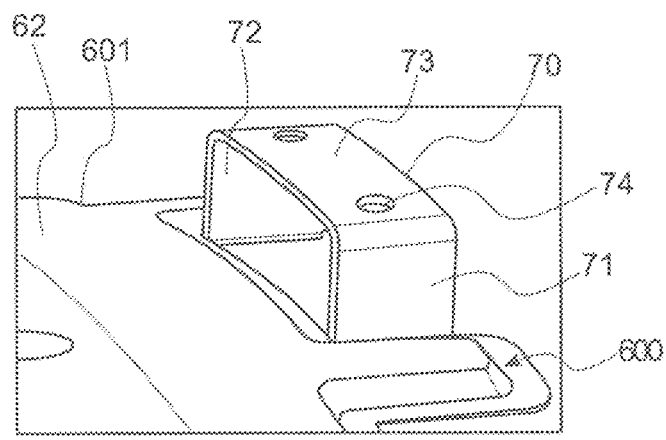
FIG. 2B shows a bracket of FIG. 2A in more detail.

Referring now to FIG. 2A that shows attachment brackets for attaching a heat shield to a wheel in a conventional assembly and FIG. 2B that shows a bracket of FIG. 2A in more detail, conventionally, attachment brackets 70 are affixed to heat shield panels or segments by means of tabs 600 provided on the heat shield panel 60 extending from a top or bottom edge 601 of the heat shield panel 60 (the top or bottom edge is the edge of the panel that runs in the circumferential direction with respect to the wheel). The bracket 70 is in the form of an essentially C-shaped part having opposing legs 71, 72 and a bridge part 73 extending from one leg to the other at one end of the legs. The other ends of the legs are each provided with a flange (not shown). The bracket 70 is fitted between two adjacent tabs 600 such that each flanges is secured to a respective tab 600 e.g. by welding. The bridge part 73 of the bracket is arranged to be secured to the wheel inner diameter surface 20 e.g. by rivets or the like that can be fastened through holes 74 in the bridge part. Typically, the bracket is attached to the tabs such that the flanges are secured to the side of the tabs that is on the radially inner side 61 of the heat shield and the legs and bridge part extend through a gap defined by adjacent tabs to the radially outer side 62 of the heat shield, across the gap between the heat shield and the wheel rim so that when the bridge part is secured to the wheel, the bracket maintains the gap between the heat shield and the wheel rim. With such an arrangement, it is necessary to provide attachment tabs on the heat shield panels that would not otherwise be required. Further, the flanges of the bracket would be exposed in the radially inner side of the heat shield. Such brackets, and the attachment points with the heat shield and with the wheel, are subject to high stresses during braking, and at high speeds can result in cracking. The brackets in combination with the tabs are relatively bulky and heavy and add to the size and weight of the heat shield assembly.

According to the present disclosure, a new bracket design and attachment is provided that avoids the need for tabs to be provided on the heat shield panel for attaching the bracket thereto. The bracket can be directly attached to the heat shield panel on the radially outer surface—i.e. on the side of the heat shield panel facing the wheel rim. The design of the bracket, and the fact that the tabs are no longer required provides a bracket with improved attachment area and a lighter overall heat shield assembly, whilst still providing the required strength and robustness to minimize deflection and wheel abrasion problems.

The bracket has an essentially Z-shaped structure comprising an attachment part defining two inner contact surfaces in a first plane each shaped to form a surface contact with the radially outer surface of the heat shield panel, and a wheel connector part defining an outer contact surface in a second plane arranged to form a surface contact with the wheel rim when the heat shield panel is located in position relative to the wheel rim, where the first and second planes are essentially parallel but spaced apart in the axial direction of the wheel, and a sloping connector part extending from the first plane to the second plane connecting a first end of the attachment part to a first end of the wheel connector part.

Figure 3A:
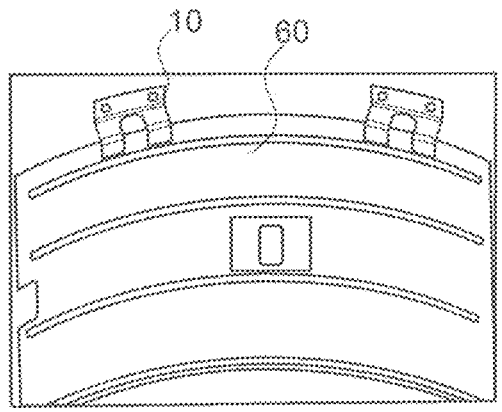
FIG. 3A shows an attachment bracket according to one example of this disclosure.
Figure 3B:
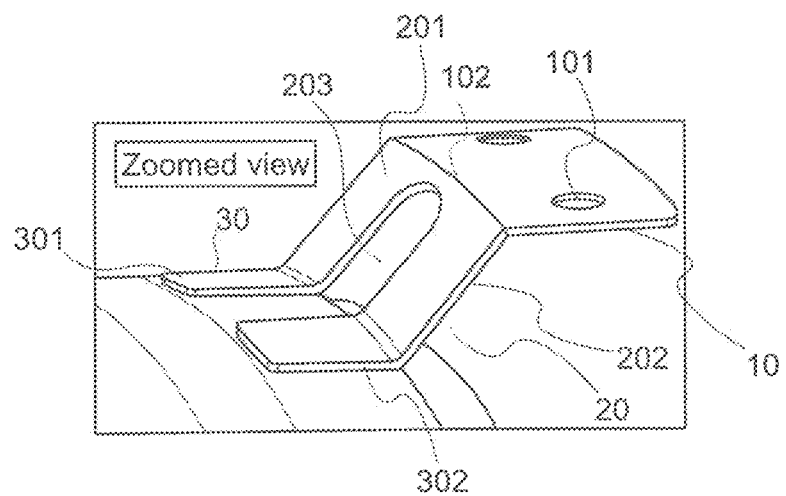
FIG. 3B shows the bracket of FIG. 3A in more detail.

In one example, as shown in FIGS. 3A and 3B, the wheel connector part 10 is a plate having a substantially rectangular cross-section (although other shapes may also be used e.g. triangular, circular etc.) and will have a slight curve to match the arc of the wheel rim 1 to which it is to be attached. If the bracket is to be connected to the wheel by rivets or the like, the fastening holes 101 can be provided in the plate 10.

The sloping connector part 20 extends from an end 102 of the wheel connector part 10 at an angle thereto. In this example, to reduce the amount of bracket material, and hence reduce its overall weight and cost, whilst maintaining strength and stability, the sloping connector part 20 is in the form of two legs 201, 202 extending from the wheel connector part end 102, defining a space 203 between the legs. The ends of the legs are then angle to form two feet 301, 302 that define the inner contact surfaces of the attachment part 30. The feet will also be formed with a curve to match the arc of the heat shield panel 60.

In use, the bracket will be attached to the heat shield panel 60 be securing the attachment part contact surfaces flat against the panel e.g. by welding. The length and angle of the sloping connector part 20 will be such as to define the required gap between the heat shield and the wheel rim, and the wheel connector part 10 will be secured to the wheel rim. Using such a design, the panels do not need additional, otherwise redundant, tabs and so the panels are simpler and lighter. Further, because the contact surface of the bracket and the heat shield panel and of the bracket and the wheel rim are all in the space between the heat shield and the wheel, they are additionally secured in place by compression from radial forces. The heat shield panels are secured in a good position without any undesired rotation and/or cracking. There is no connection between the bracket and the heat shield on the radially inner surface of the panel (i.e. the surface facing inwards towards the wheel axle) and this results in reduced stresses between the bracket and the heat shield in use.

FIGS. 4A to 4D show an alternative bracket design that also provides good stiffness to the assembly with reduced overall mass, and which shares, with the first example, the general Z-shape and the attachment, at both ends, within the space between the heat shield and the wheel rim, thus avoiding the need for tabs on the heat shield panel and reducing stresses on the bracket/heat shield/wheel attachment.

In this example, both the wheel connector part 10' and the attachment part 30' are formed to define two spaced apart contact surfaces 11, 12; 31, 32 with a gap 13, 33 therebetween. The sloping connector part 20', in this design, is a single strut connecting the wheel connecting part and the attachment part. The wheel connecting part contact surfaces 11, 12 may each be provided with a hole 111, 112 for attachment to the wheel e.g. by rivets (not shown). The contact surfaces 31, 32 may be attached to the heat shield panel by means of welding e.g. spot welding.

Figure 4A:
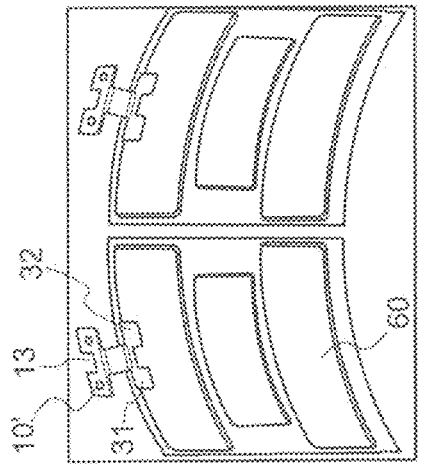
FIG. 4A shows an attachment bracket according to another example of this disclosure.
Figure 4B:
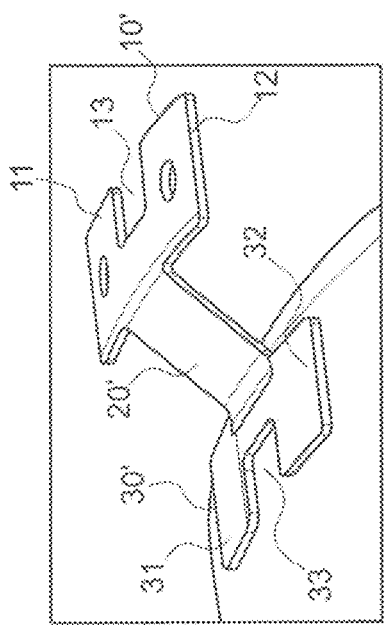
FIG. 4B shows the bracket of FIG. 4A in more detail from one perspective.
Figure 4C:
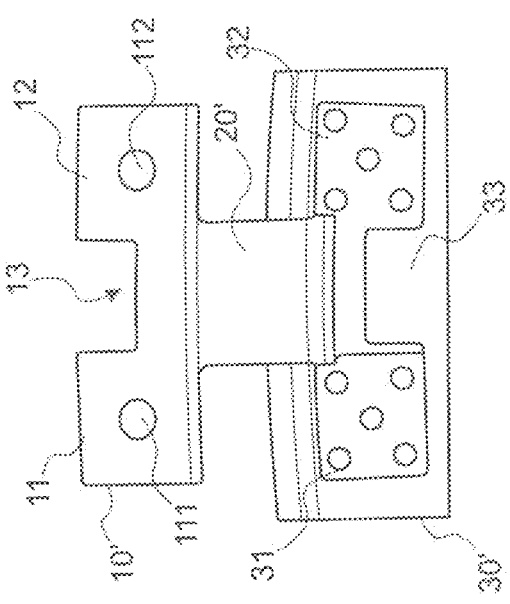
FIG. 4C shows the bracket of FIG. 4A in more detail from a different perspective.
Figure 4D:
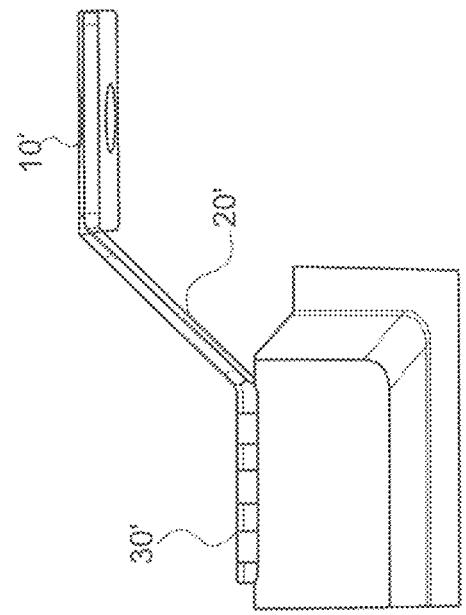
FIG. 4D shows the bracket of FIG. 4A in more detail from a third perspective.

FIG. 4C shows a spot welding pattern that has been found to be advantageous in terms of cost versus strength, but other spot welding patterns, or types of welding or other fastening means may also be used.

FIGS. 3 and 4 show just two possible designs of bracket. Other designs may also be envisaged within the scope of the claims.

The brackets according to this disclosure can be used for attaching different designs of heat shield including one-piece shields as well as multi-segment heat shields connected to each other in various ways.

The high stiffness, combined with the low weight of the bracket, as well as its ease of manufacture and assembly means that the whole heat shield assembly can be mass manufactured without the need to form tabs on the heat shield panels, and the overall weight of the assembly is also reduced. The stresses at the attachment areas are also reduced.

What is claimed is:

1. An attachment bracket for fastening a heat shield panel of a wheel assembly to a radially inner surface of a wheel, the attachment bracket having an essentially Z-shaped structure comprising an attachment part defining two inner contact surfaces in a first plane each shaped to form, in use, a surface contact with a radially outer surface of the heat shield panel, and a wheel connector part defining an outer contact surface in a second plane arranged to form, in use, a surface contact with the wheel when the heat shield panel is located in position relative to the wheel, where the first and second planes are essentially parallel but spaced apart in an axial direction of the wheel, and a sloping connector part extending from the first plane to the second plane connecting a first end of the attachment part to a first end of the wheel connector part, wherein the wheel connector part is in the form of a plate having a curvature to match the curvature of the radially inner surface of the wheel to which it is to be attached.

2. The attachment bracket of claim 1, wherein the sloping connector part comprises two essentially parallel legs with a space therebetween.

3. The attachment bracket of claim 1, wherein the sloping connector part comprises a single strut extending from the attachment part to the wheel connector part.

4. The attachment bracket of claim 1, wherein the attachment part is in the form of two spaced apart connector feet having a curvature to match the curvature of the radially outer surface of the heat shield panel to which it is to be attached.

5. The attachment bracket of claim 1, wherein the wheel connector part is provided with one or more holes to receive a fastener for attachment to the wheel.

6. The attachment bracket of claim 1, wherein the attachment part is arranged to be attached to the heat shield panel by welding.

7. The attachment bracket of claim 6, wherein a pattern of weld spots is provided on the attachment part for spot welding the attachment part to the heat shield panel.

8. The attachment bracket of claim 1, wherein the attachment part is arranged to be attached to the heat shield panel by welding.

9. The attachment bracket of claim 8, wherein a pattern of weld spots is provided on the attachment part for spot welding the attachment part to the heat shield panel.

10. A heat shield assembly for a wheel assembly, comprising a plurality of arcuate heat shield panels arranged to be connected together to form a heat shield to be attached to the interior of a wheel, the heat shield positioned with a radially outer surface facing a radially inner surface of the wheel, and one or more attachment brackets arranged to attach the heat shield to the wheel, the one or more attachment brackets being positioned, when attached, between the heat shield and the wheel, wherein an attachment part is attached to the radially outer surface of the heat shield and a wheel connector part is arranged to be attached to the radially inner surface of the wheel, wherein the wheel connector part is in the form of a plate having a curvature to match the curvature of the radially inner surface of the wheel to which it is to be attached.

11. The wheel assembly comprising the wheel defining the radially inner surface and the heat shield assembly as claimed in claim 10 connected to and spaced from the radially inner surface of the wheel by the one or more attachment brackets.

12. The wheel assembly of claim 11, being a wheel assembly for landing gear of an aircraft.

13. An attachment bracket for fastening a heat shield panel of a wheel assembly to a radially inner surface of a wheel, the attachment bracket having an essentially Z-shaped structure comprising an attachment part defining two inner contact surfaces in a first plane each shaped to form, in use, a surface contact with a radially outer surface of the heat shield panel, and a wheel connector part defining an outer contact surface in a second plane arranged to form, in use, a surface contact with the wheel when the heat shield panel is located in position relative to the wheel, where the first and second planes are essentially parallel but spaced apart in an axial direction of the wheel, and a sloping connector part extending from the first plane to the second plane connecting a first end of the attachment part to a first end of the wheel connector part, wherein the wheel connector part is in the form of two spaced apart plates having a curvature to match the curvature of the radially inner surface of the wheel to which the wheel connector part is to be attached.

14. The attachment bracket of claim 13, wherein the sloping connector part comprises two essentially parallel legs with a space therebetween.

15. The attachment bracket of claim 13, wherein the sloping connector part comprises a single strut extending from the attachment part to the wheel connector part.

16. The attachment bracket of claim 13, wherein the attachment part is in the form of two spaced apart connector feet having a curvature to match the curvature of the radially outer surface of the heat shield panel to which it is to be attached.

17. The attachment bracket of claim 13, wherein the wheel connector part is provided with one or more holes to receive a fastener for attachment to the wheel.

18. A heat shield assembly for a wheel assembly, comprising a plurality of arcuate heat shield panels arranged to be connected together to form a heat shield to be attached to the interior of a wheel, the heat shield positioned with a radially outer surface facing a radially inner surface of the wheel, and one or more attachment brackets arranged to attach the heat shield to the wheel, the one or more attachment brackets being positioned, when attached, between the heat shield and the wheel, wherein an attachment part is attached to the radially outer surface of the heat shield and a wheel connector part is arranged to be attached to the radially inner surface of the wheel, wherein the wheel connector part is in the form of two spaced apart plates having a curvature to match the curvature of the radially inner surface of the wheel to which the wheel connector part is to be attached.

19. The wheel assembly comprising the wheel defining the radially inner surface and the heat shield assembly as claimed in claim 18 connected to and spaced from the radially inner surface of the wheel by the one or more attachment brackets.

20. The wheel assembly of claim 19, being a wheel assembly for landing gear of an aircraft.

\* \* \* \* \*